United States Patent
Hirasawa et al.

(10) Patent No.: US 9,531,312 B2
(45) Date of Patent: Dec. 27, 2016

(54) VEHICLE AND METHOD OF CONTROLLING VEHICLE

(75) Inventors: Takahiko Hirasawa, Toyota (JP); Masashi Yoshimi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/345,474

(22) PCT Filed: Sep. 26, 2011

(86) PCT No.: PCT/JP2011/005401
§ 371 (c)(1),
(2), (4) Date: Mar. 18, 2014

(87) PCT Pub. No.: WO2013/046252
PCT Pub. Date: Apr. 4, 2013

(65) Prior Publication Data
US 2014/0291994 A1  Oct. 2, 2014

(51) Int. Cl.
*B60L 9/00* (2006.01)
*G05D 1/00* (2006.01)
(Continued)

(52) U.S. Cl.
CPC . *H02P 9/04* (2013.01); *B60L 1/00* (2013.01); *B60L 1/006* (2013.01); *B60L 11/1859* (2013.01); *B60L 11/1861* (2013.01); *B60R 16/03* (2013.01); *B60W 10/30* (2013.01); *B60L 2240/36* (2013.01); *B60L 2240/54* (2013.01); *B60L 2250/10* (2013.01); *B60L 2250/16* (2013.01); *B60L 2250/30* (2013.01); *B60L 2260/12* (2013.01);
(Continued)

(58) Field of Classification Search
USPC .................................................. 307/23, 66
See application file for complete search history.

(56) References Cited

U.S. PATENT DOCUMENTS 5,521,443 A  5/1996 Imura et al.
5,595,064 A  1/1997 Ikeda et al.
(Continued)

FOREIGN PATENT DOCUMENTS

JP  10 042570  2/1998
JP  2000 303874  10/2000
(Continued)

OTHER PUBLICATIONS

International Search Report Issued Nov. 1, 2011 in PCT/JP11/005401 Filed Sep. 26, 2011.

*Primary Examiner* — Bhavesh V Amin
(74) *Attorney, Agent, or Firm* — Oblon, McClelland, Maier & Neustadt, L.L.P.

(57) ABSTRACT

A vehicle includes a feeding system supplying an electric power to an external device disposed outside the vehicle, a controller controlling the operation of the feeding system, and an information output unit outputting predetermined information. The controller performs the processing of determining whether or not feeding can be performed from the feeding system to the external device. When the feeding from the feeding system to the external device is prohibited, the controller causes the information output unit to output prohibition information about the prohibition of the feeding including the contents of a determination processing.

15 Claims, 3 Drawing Sheets

(51) Int. Cl.
*G06F 7/00* (2006.01)
*H02P 9/04* (2006.01)
*B60L 11/18* (2006.01)
*B60L 1/00* (2006.01)
*B60R 16/03* (2006.01)
*B60W 10/30* (2006.01)

(52) U.S. Cl.
CPC ........... *B60L 2260/16* (2013.01); *Y02T 10/705* (2013.01); *Y02T 10/7005* (2013.01); *Y02T 10/7044* (2013.01)

(56) References Cited

U.S. PATENT DOCUMENTS

| | | | |
|---|---|---|---|
| 6,104,160 A * | 8/2000 | Iwata et al. | 320/103 |
| 7,839,020 B2 * | 11/2010 | Nakanishi | 307/65 |
| 8,525,473 B2 * | 9/2013 | Shimizu et al. | 320/109 |
| 8,860,361 B2 * | 10/2014 | Fukuzawa | 320/103 |
| 2002/0047419 A1 | 4/2002 | Shimizu et al. | |
| 2006/0113798 A1 | 6/2006 | Oyobe et al. | |
| 2009/0026841 A1 * | 1/2009 | Nakanishi | 307/66 |
| 2009/0278492 A1 * | 11/2009 | Shimizu et al. | 320/108 |
| 2011/0068740 A1 | 3/2011 | Ang | |
| 2014/0225437 A1 * | 8/2014 | Mizuno | 307/23 |

FOREIGN PATENT DOCUMENTS

| | | |
|---|---|---|
| JP | 2001 231106 | 8/2001 |
| JP | 2002 054494 | 2/2002 |
| JP | 2006 158123 | 6/2008 |
| JP | 2008-211955 | 9/2008 |
| JP | 2008 223646 | 9/2008 |

* cited by examiner

VEHICLE AND METHOD OF CONTROLLING VEHICLE

TECHNICAL FIELD

The present invention relates to a vehicle capable of supplying an electric power to a device disposed outside the vehicle and a method of controlling the vehicle.

BACKGROUND ART

Patent Document 1 has disclosed a vehicle in which an engine provides torque for a generator to generate an electric power and the generated electric power is supplied to the outside of the vehicle. When the remaining amount of the fuel for driving the engine is less than a threshold value, the feeding to the outside of the vehicle is inhibited. Once the feeding to the outside of the vehicle is inhibited, an indicator light is turned off to allow a vehicle occupant to recognize that the feeding to the outside of the vehicle cannot be performed.

PRIOR ART DOCUMENTS

Patent Documents

[Patent Document 1] Japanese Patent Laid-Open No. 2000-303874
[Patent Document 2] Japanese Patent Laid-Open No. 10-042570
[Patent Document 3] Japanese Patent Laid-Open No. 2006-158123

DISCLOSURE OF THE INVENTION

Problems to be Solved by the Invention

In the technology described in Patent Document 1, the occupant can recognize by the turn-off of the indicator light that the feeding to the outside of the vehicle is inhibited. Only the turn-off of the indicator light, however, cannot allow the occupant to see the reason for the inhibition of the feeding. Since the feeding to the outside of the vehicle may be inhibited on the basis of various defects in a feeding system, the occupant may wish to see the reason for the inhibition of the feeding.

Means for Solving the Problems

According to a first aspect, the present invention provides a vehicle including a feeding system supplying an electric power to an external device disposed outside the vehicle, a controller controlling the operation of the feeding system, and an information output unit outputting predetermined information. The controller performs the processing of determining whether or not feeding can be performed from the feeding system to the external device. When the feeding from the feeding system to the external device is prohibited, the controller causes the information output unit to output prohibition information about the prohibition of the feeding including the contents of the determination processing.

According to the first aspect of the present invention, the information output unit outputs not only the information about the prohibition of the feeding but also the information about the contents of the determination processing. A user can recognize the reason for the prohibition of the feeding by checking the contents of the determination result. Once the reason for the prohibition of the feeding is recognized, the user can decide on action to be taken.

The feeding system can include an engine producing a motive power through combustion of a fuel, a generator receiving the motive power from the engine to generate an electric power, and a sensor detecting the remaining amount of the fuel. The controller can determine that the feeding to the external device cannot be performed when the remaining amount detected by the sensor is less than a threshold value. In this case, the information output unit can be used to notify the user of the information about the prohibition of the feeding and the information about the insufficient remaining amount of the fuel.

The controller can determine that the feeding to the external device cannot be performed when a time of power generation by the generator is longer than a set time. In this case, the information output unit can be used to notify the user of the information about the prohibition of the feeding and the information about the time of power generation. The user can recognize that the reason for the prohibition of the feeding lies in the time of power generation exceeding the set time. An example of the information about the time of power generation is information representing that the time of power generation exceeds the set time.

The determination processing can be performed on the basis of the state of the engine or the generator. The information output unit can be used to notify the user of the information about the prohibition of the feeding and the information about the state of the engine or the generator when the feeding to the external device is prohibited. The user can recognize that the reason for the prohibition of the feeding lies in the state of the engine or the generator.

The feeding system can be formed of an electric storage apparatus outputting an electric power used in running of the vehicle and an electric power to be supplied to the external device. The determination processing can be performed on the basis of the state of the electric storage apparatus. The information output unit can be used to notify the user of the information about the prohibition of the feeding and the information about the state of the electric storage apparatus when the feeding to the external device is prohibited. The user can recognize that the reason for the prohibition of the feeding lies in the state of the electric storage apparatus.

The information output unit can be provided by using a display or a speaker. The information output unit can transmit the prohibition information to a portable device. When the portable device has a display, the information output unit can transmit information to be shown on the display as the prohibition information. The user can check the information about the prohibition of the feeding and the information about the reason for the prohibition of the feeding by seeing the display of the portable device.

When the portable device has a speaker, the information output unit can transmit sound information to be output from the speaker as the prohibition information. The user can check the information about the prohibition of the feeding and the information about the reason for the prohibition of the feeding by listening to the sound information output from the speaker.

According to a second aspect, the present invention provides a control method of controlling a feeding system mounted on a vehicle and supplying an electric power to an external device disposed outside the vehicle, including performing the processing of determining whether or not feeding can be performed from the feeding system to the external device. When the feeding from the feeding system to the external device is prohibited, prohibition information about the prohibition of the feeding including the contents of the determination processing is output from an information output unit. The second aspect of the present invention can achieve the same advantages as those in the first aspect.

MODE FOR CARRYING OUT THE INVENTION

Embodiments of the present invention will hereinafter be described.

Embodiment 1

Figure 1:
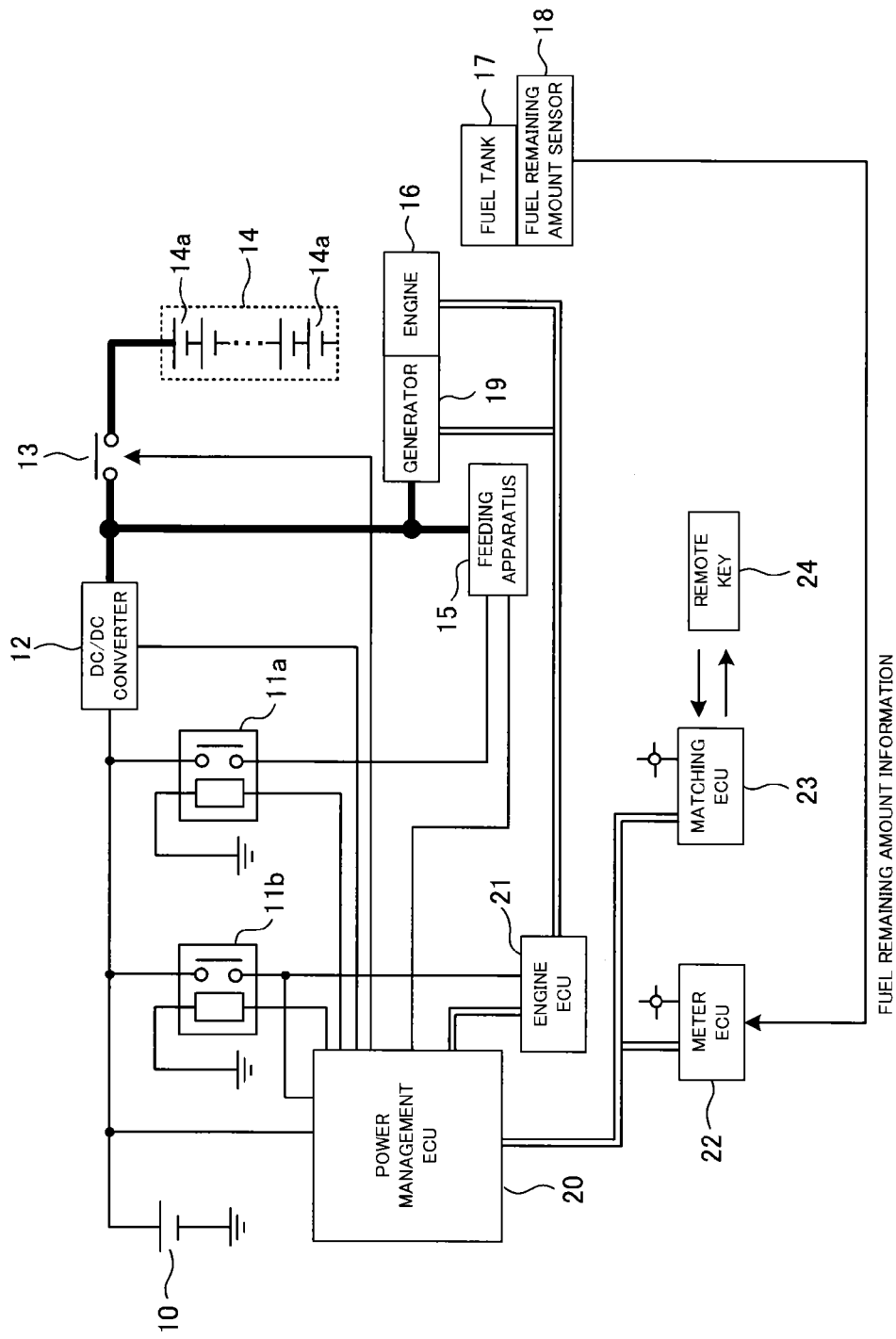
FIG. 1 is a diagram showing part of a system mounted on a vehicle.

A vehicle which is Embodiment 1 of the present invention is described with reference to FIG. 1. FIG. 1 is a diagram showing part of a system mounted on the vehicle. The vehicle of the present embodiment can be run by using the outputs from an assembled battery (corresponding to an electric storage apparatus) and an engine.

An auxiliary battery 10 supplies an electric power to auxiliaries mounted on the vehicle. In the system shown in FIG. 1, the auxiliary battery 10 supplies the electric power to a power management ECU (electronic control unit) 20, an engine ECU 21, a DC/DC converter 12, and a feeding apparatus 15. Each thin line shown in FIG. 1 indicates a line on which the electric power is supplied from the auxiliary battery 10. The auxiliaries also include air-conditioning equipment, a radio, and a car navigation system, for example. The auxiliary battery 10 is formed of a secondary battery such as a lead-acid battery.

An IG relay 11a receives a control signal from the power management ECU 20 to switch between ON and OFF. While the IG relay 11a is ON, the electric power of the auxiliary battery 10 can be supplied to the feeding apparatus 15 to operate the feeding apparatus 15. An IG relay 11b receives a control signal from the power management ECU 20 to switch between ON and OFF. While the IG relay 11b is ON, the electric power of the auxiliary battery 10 can be supplied to the engine ECU 21 to operate the engine ECU 21.

The DC/DC converter 12 converts a voltage output from an assembled battery 14 into a voltage to be supplied to the auxiliary battery 10. Specifically, the DC/DC converter 12 drops the voltage output from the assembled battery 14 and outputs the dropped electric power to the auxiliary battery 10. The supply of the electric power from the assembled battery 14 to the auxiliary battery 10 can charge the auxiliary battery 10.

The DC/DC converter 12 is connected to the assembled battery 14 through a system main relay 13. The system main relay 13 receives a control signal from the power management ECU 20 to switch between ON and OFF. While the system main relay 13 is ON, the electric power of the assembled battery 14 can be supplied to the DC/DC converter 12 or the electric power output from the assembled battery 14 can be used to run the vehicle.

For running the vehicle using the electric power output from the assembled battery 14, an inverter is used to convert a DC power output from the assembled battery 14 into an AC power. The AC power (electric energy) provided by the inverter is supplied to a motor generator coupled to wheels. This allows the motor generator to generate a kinetic energy for running of the vehicle.

For stopping or decelerating the vehicle, the motor generator converts a kinetic energy generated in braking of the vehicle into an electric energy (AC power). The inverter converts the AC power generated by the motor generator into a DC power and outputs the DC power to the assembled battery 14. Thus, the regenerative power can be stored in the assembled battery 14.

The assembled battery 14 includes a plurality of cells 14a connected electrically in series. The cell 14a can be provided by using a secondary battery such as a nickel metal hydride battery or a lithium-ion battery. An electric double layer capacitor may be used instead of the secondary battery.

The number of the cells 14a constituting the assembled battery 14 can be set as appropriate in view of the output and the like required of the assembled battery 14. The voltage of the assembled battery 14 is higher than the voltage of the auxiliary battery 10. The assembled battery 14 may include a plurality of cells 14a connected electrically in parallel. Each thick line shown in FIG. 1 indicates a line on which the electric power is supplied from the assembled battery 14.

An engine 16 generates a motive power through combustion of a fuel. The fuel is stored in a fuel tank 17 mounted on the vehicle. The engine 16 is provided by using a gasoline engine, a diesel engine, and an engine involving combustion of a gaseous fuel such as liquefied petroleum gas or natural gas. The engine 16 is coupled to the wheels, and the motive power generated by the engine 16 is transferred to the wheels to enable the running of the vehicle.

The fuel tank 17 is provided with a fuel remaining amount sensor 18. The fuel remaining amount sensor 18 detects the liquid level of the fuel stored in the fuel tank 17 and outputs the detection result (fuel remaining amount information) to a meter ECU 23. The meter ECU 23 transmits the fuel remaining amount information to the power management ECU 20. The fuel remaining amount sensor 18 has a float which has buoyancy in the fuel. Since the position of the float is changed as the fuel is increased or reduced, the fuel remaining amount sensor 18 can detect the liquid level of the fuel, that is, the remaining amount of the fuel.

A generator 19 uses the motive power generated by the engine 16 to generate an electric power. The generator 19 can generate an AC power, for example. The engine ECU 21 controls the operations of the engine 16 and the generator 19.

The feeding apparatus 15 converts the DC power output from the assembled battery 14 into an AC power or converts the electric power generated by the generator 19 into a predetermined electric power. The feeding apparatus 15 can provide an AC power at 100 V, for example. The AC power provided by the feeding apparatus 15 can be output to the outside of the vehicle. Extra electric power generated by the generator 19 can be supplied to the assembled battery 14 to charge the assembled battery 14.

The vehicle is provided with a receptacle connected to the feeding apparatus 15. A plug of an external device can be inserted into the receptacle to supply the electric power output from the feeding apparatus 15 to the external device. The external device is a device provided independently of the vehicle and outside the vehicle. It is only required that the external device should operate with the supply of an AC power. An electrical appliance is an example of the external device.

In the present embodiment, the electric power of the assembled battery 14 is first supplied to the external device through the feeding apparatus 15. When the assembled battery 14 is discharged to reduce the State of Charge (SOC) of the assembled battery 14 below a threshold value, the power management ECU 20 starts the engine 16 through the engine ECU 21. At the start of the engine 16, the power management ECU 20 inhibits the discharge of the assembled battery 14. The SOC represents a ratio of the current charge capacity to the full charge capacity of the assembled battery 14. The threshold value for the SOC of the assembled battery 14 can be set as appropriate. The start of the engine 16 allows the generator 19 to generate an electric power which then can be supplied to the external device through the feeding apparatus 15. The start of the engine 16 consumes the fuel.

The meter ECU 22 receives information from the power management ECU 20 to display particular information on a display mounted on the vehicle or to output particular information from a speaker mounted on the vehicle. Each double line shown in FIG. 1 indicates a communication line. For example, the meter ECU 22 can display the running speed of the vehicle, the fuel remaining amount, and the charge/discharge state of the assembled battery 14 on the display.

A matching ECU 23 wirelessly communicates with a remote key (corresponding to a portable device) 24. The matching ECU 23 can receive information from the remote key 24 to perform matching. Specifically, the matching ECU 23 can determine whether or not identification information owned by the matching ECU 23 matches identification information transmitted from the remote key 24 and output the information of the determination to the power management ECU 20.

When there is a match between the two identification information items, the vehicle can be started through the operation of the remote key 24. The operation of the remote key 24 can also activate the feeding apparatus 15 to supply the electric power from the feeding apparatus 15 to the external device. The remote key 24 can be provided with a display or a speaker.

Figure 2:
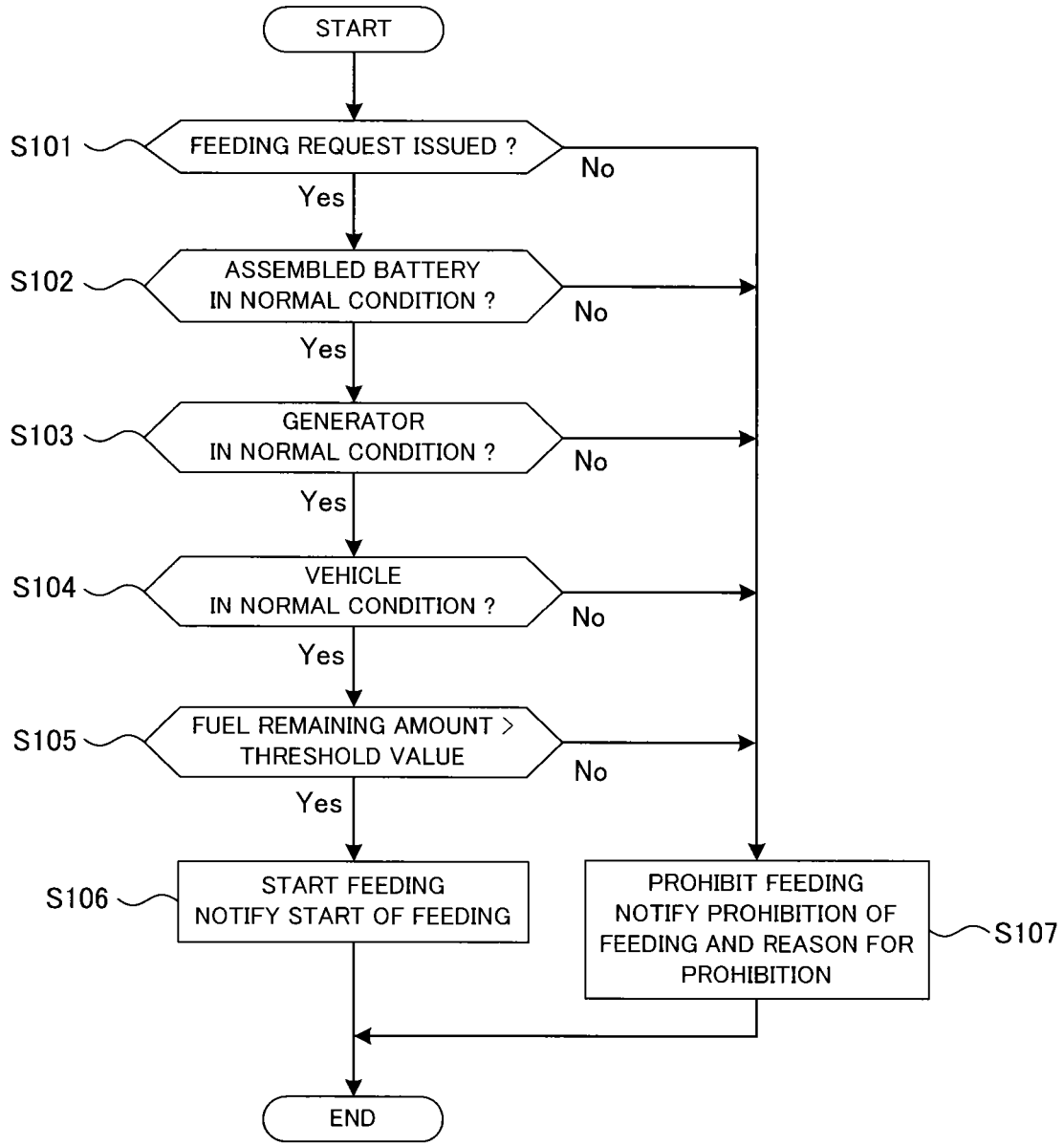
FIG. 2 is a flow chart showing the processing of supplying an electric power to an external device in Embodiment 1.

Next, description is made of the processing performed when the electric power is supplied to the external device in the vehicle of the present embodiment with reference to a flow chart shown in FIG. 2. The processing shown in FIG. 2 is performed by the power management ECU 20.

At step S101, the power management ECU 20 determines whether or not a feeding request is issued. When the feeding request is issued, the power management ECU 20 proceeds to processing at step S102. When no feeding request is issued, the power management ECU 20 proceeds to processing at step S107.

The information about the feeding request is input to the power management ECU 20. For example, the vehicle may be provided with a switch for feeding, and when the switch is operated, the information about the operation of the switch may be input to the power management ECU 20. In response to the input signal from the switch, the power management ECU 20 can determine that the feeding request is issued.

Alternatively, the feeding request may be issued through the operation of the remote key 24. For issuing the feeding request through the operation of the remote key 24, matching processing is first performed between the remote key 24 and the matching ECU 23. After the matching processing is completed, the matching ECU 23 transmits the information about the operation of the remote key 24 to the power management ECU 20. When the feeding request is issued through the operation of the remote key 24, the information about the feeding request is transmitted from the matching ECU 23 to the power management ECU 20. The power management ECU 20 can receive the information about the feeding request from the matching ECU 23 to determine that the feeding request is issued.

At step S102, the power management ECU 20 determines whether or not the assembled battery 14 is in normal condition. The measures of the condition of the assembled battery 14 include the SOC, the voltage, and the temperature, for example. The determination of whether or not the assembled battery 14 is in normal condition can be made by using at least one of the determination parameters including the SOC, the voltage, and the temperature. When the assembled battery 14 is in normal condition, the power management ECU 20 proceeds to processing at step S103. When the assembled battery 14 is not in normal condition, the power management ECU 20 proceeds to the processing at step S107.

When the SOC of the assembled battery 14 is higher than the lower limit SOC and is lower than the upper limit SOC, the power management ECU 20 can determine that the assembled battery 14 is in normal condition. The lower limit SOC and the upper limit SOC can be preset in view of the input/output characteristics and the like of the assembled battery 14. The information about the set SOC can be stored in a memory.

When the SOC of the assembled battery 14 is lower than the lower limit SOC, the assembled battery 14 may be overdischarged and the power management ECU 20 determines that the assembled battery 14 is not in normal condition. When the SOC of the assembled battery 14 is higher than the upper limit SOC, the assembled battery 14 may be overcharged and the power management ECU 20 determines that the assembled battery 14 is not in normal condition.

The SOC of the assembled battery 14 can be obtained from the Open Circuit Voltage (OCV) of the assembled battery 14. Since the SOC and the OCV are associated with each other, the association between them can be previously found to obtain the SOC from the OCV. The OCV of the assembled battery 14 can be calculated from the voltage (CCV: Closed Circuit Voltage) of the assembled battery 14 detected by a voltage sensor. Alternatively, the SOC of the assembled battery 14 may be calculated by detecting the charge and discharge currents of the assembled battery 14 with a current sensor and summing the current values detected when the assembled battery 14 is charged and discharged.

Although the determination of whether or not the assembled battery 14 is in normal condition is made on the basis of the SOC of the assembled battery 14 in the present embodiment, the present invention is not limited thereto. The determination of whether or not the assembled battery 14 is in normal condition may be made on the basis of the SOC of the cell 14a forming the assembled battery 14. For example, when the SOC of the cell 14a is higher than the lower limit SOC and is lower than the upper limit SOC, the power management ECU 20 can determine that the assembled battery 14 is in normal condition. The lower limit SOC and the upper limit SOC of the cell 14a may be identical to or different from the lower limit SOC and the upper limit SOC of the assembled battery 14, respectively.

When the voltage of the assembled battery 14 is higher than the lower limit voltage and is lower than the upper limit voltage, the power management ECU 20 can determine that the assembled battery 14 is in normal condition. A voltage sensor can be used to detect the voltage of the assembled battery 14, and the information of the detection by the voltage sensor is input to the power management ECU 20.

The lower limit voltage and the upper limit voltage can be preset in view of the input/output characteristics and the like of the assembled battery 14. The information about the set voltage can be stored in the memory.

When the voltage of the assembled battery 14 is lower than the lower limit voltage, the assembled battery 14 may be overdischarged and the power management ECU 20 determines that the assembled battery 14 is not in normal condition. When the voltage of the assembled battery 14 is higher than the upper limit voltage, the assembled battery 14 may be overcharged and the power management ECU 20 determines that the assembled battery 14 is not in normal condition.

Although the determination of whether or not the assembled battery 14 is in normal condition is made on the basis of the voltage of the assembled battery 14 in the present embodiment, the present invention is not limited thereto. The determination of whether or not the assembled battery 14 is in normal condition may be made on the basis of the voltage of the cell 14*a* forming the assembled battery 14. For example, when the voltage of each cell 14*a* is higher than the lower limit voltage and is lower than the upper limit voltage, the power management ECU 20 can determine that the assembled battery 14 is in normal condition. The lower limit voltage and the upper limit voltage of the cell 14*a* are different from the lower limit voltage and the upper limit voltage of the assembled battery 14, respectively.

When the temperature of the assembled battery 14 is higher than the lower limit temperature and is lower than the upper limit temperature, the power management ECU 20 determines that the assembled battery 14 is in normal condition. A temperature sensor can be used to detect the temperature of the assembled battery 14, and the information of the detection by the temperature sensor is input to the power management ECU 20. The lower limit temperature and the upper limit temperature can be preset in view of the input/output characteristics and the like of the assembled battery 14. The information about the set temperature can be stored in the memory.

When the temperature of the assembled battery 14 is lower than the lower limit temperature or is higher than the upper limit temperature, the favorable output from the assembled battery 14 may not be ensured. In this case, the power management ECU 20 determines that the assembled battery 14 is not in normal condition.

At step S103, the power management ECU 20 determines whether or not the generator 19 is in normal condition. An exemplary measure of the condition of the generator 19 is the temperature of the generator 19. When the temperature of the generator 19 is higher than a predetermined threshold value, the power generation performance of the generator 19 is reduced. Thus, when the temperature of the generator 19 is higher than the threshold value, the power management ECU 20 determines that the generator 19 is not in normal condition.

The threshold value for the temperature of the generator 19 can be set as appropriate in view of the power generation performance and the like of the generator 19. The information about the threshold value can be stored in the memory. A temperature sensor can be used to detect the temperature of the generator 19, and the information of the detection by the temperature sensor is input to the power management ECU 20.

At step S104, the power management ECU 20 determines whether or not the vehicle is in normal condition. Specifically, the power management ECU 20 determines whether or not the system for supplying the electric power of the assembled battery 14 to the external device and the system for supplying the electric power generated by the generator 19 to the external device normally operate. For example, when the engine 16 or the generator 19 is out of order, the power management ECU 20 determines that the vehicle is not in normal condition.

At step S105, the power management ECU 20 obtains the fuel remaining amount information from the meter ECU 22. The fuel remaining amount sensor 18 detects the remaining amount of the fuel stored in the fuel tank 17 and outputs the detection result to the meter ECU 22. The meter ECU 22 outputs the detection result from the fuel remaining amount sensor 18 to the power management ECU 20.

The power management ECU 20 determines whether or not the remaining amount of the fuel is more than a threshold value. The threshold value for the remaining amount of the fuel can be preset, and the information about the threshold value can be stored in the memory. When the remaining amount of the fuel is more than the threshold value, the power management ECU 20 proceeds to processing at step S106. When the remaining amount of the fuel is less than the threshold value, the power management ECU 20 proceeds to the processing at step S107.

At step S106, the power management ECU 20 can activate the feeding apparatus 15 to start feeding to the external device. Specifically, the power management ECU 20 switches the IG relays 11*a* and 11*b* from OFF to ON. Next, the power management ECU 20 operates the DC/DC converter 12 and switches the system main relay 13 from OFF to ON.

Once the system main relay 13 is switched from OFF to ON, the electric power of the assembled battery 14 can be supplied to the external device through the feeding apparatus 15. When the assembled battery 14 is discharged to reduce the voltage (or the SOC) of the assembled battery 14, the power management ECU 20 stops the discharge of the assembled battery 14. The power management ECU 20 can obtain the voltage or the SOC of the assembled battery 14 based on the output from the voltage sensor.

After the discharge of the assembled battery 14 is stopped, the engine ECU 21 receives control information from the power management ECU 20 to start the engine 16. With the start of the engine 16, the generator 19 receives the motive power from the engine 16 to generate the electric power which is then supplied to the external device through the feeding apparatus 15.

At step S106, the power management ECU 20 notifies a user of the start of the feeding through the use of a sound or display.

Specifically, the power management ECU 20 transmits information representing the start of the feeding to the meter ECU 22 or the matching ECU 23. In response to the information transmitted from the power management ECU 20, the meter ECU 22 can show feeding start information on the display mounted on the vehicle or output the feeding start information (sound) from the speaker mounted on the vehicle.

When the remote key 24 is provided with the display or the speaker, the matching ECU 23 transmits the feeding start information to the remote key 24. In response to the information from the matching ECU 23, the remote key 24 can show the feeding start information on the display or output the feeding start information (sound) from the speaker.

When the feeding start information is represented on the display of the vehicle or the remote key 24, it is only required that the representation on the display should allow the user to recognize the start of the feeding. When the feeding start information is output as the sound from the speaker of the vehicle or the remote key 24, it is only required that the sound information should allow the user to recognize the start of the feeding.

At step S107, the power management ECU 20 prohibits the operation of the feeding apparatus 15. When the supply of the electric power is in progress from the feeding apparatus 15 to the external device, that supply of the electric power to the external device is stopped.

At step S107, the power management ECU 20 notifies the user of a failure to perform the feeding with a sound or display. Specifically, the power management ECU 20 transmits information representing the failure to perform the feeding to the meter ECU 22 or the matching ECU 23. In response to the information transmitted from the power management ECU 20, the meter ECU 22 can show feeding prohibition information on the display mounted on the vehicle or output the feeding prohibition information (sound) from the speaker mounted on the vehicle.

When the remote key 24 is provided with the display or the speaker, the matching ECU 23 transmits the feeding prohibition information to the remote key 24. In response to the information from the matching ECU 23, the remote key 24 can show the feeding prohibition information on the display or output the feeding prohibition information (sound) from the speaker.

The transmission of the feeding start information or the feeding prohibition information to the remote key 24 allows the user to see the feeding information using the remote key 24 when the external device is used remotely from the vehicle.

When the feeding prohibition information is shown on the display of the vehicle or the remote key 24, it is only required that the representation on the display should allow the user to recognize the prohibition of the feeding. When the feeding prohibition information is output as the sound from the speaker of the vehicle or the remote key 24, it is only required that the sound information should allow the user to recognize the prohibition of the feeding.

The power management ECU 20 can also notify the user of the prohibition of the feeding by driving a light mounted on the vehicle. For example, the light can be driven in a predetermined blinking pattern to notify the user of the prohibition of the feeding. Any light mounted on the vehicle can be used, and examples of the light include a headlight, a taillight, and a room light.

Information about the reason for the prohibition of the feeding can be shown on the display of the vehicle or the remote key 24. When the power management ECU 20 proceeds from the processing at steps S101 to S105 to the processing at step S107, the contents determined in the processing at steps S101 to S105 can be regarded as the reason for the prohibition of the feeding.

When no feeding request is issued in the processing at step S101, information representing that no feeding request is received can be shown on the display as the reason for the prohibition of the feeding. It is only required that the representation on the display should allow the user to recognize that no feeding request is received.

In issuing the feeding request through the operation of the switch mounted on the vehicle, the user may erroneously operate the switch and fail to issue the feeding request correctly. In issuing the feeding request through the operation of the remote key 24, the user may erroneously operate the remote key 24 and fail to issue the feeding request correctly. In such a case, the user can recognize that no feeding request is issued by seeing the representation on the display. Then, the user can operate the switch or the remote key 24 to reissue the feeding request.

When it is determined in the processing at step S102 that the assembled battery 14 is not in normal condition, the information representing that the assembled battery 14 is not in normal condition can be shown on the display as the reason for the prohibition of the feeding. It is only required that the representation on the display should allow the user to recognize that the assembled battery 14 is not in normal condition. The user can recognize that the assembled battery 14 is not in normal condition by seeing the representation on the display. Thus, the user can understand that the assembled battery 14 needs inspection.

When it is determined in the processing at step S103 that the generator 19 is not in normal condition, the information representing that the generator 19 is not in normal condition can be shown on the display as the reason for the prohibition of the feeding. It is only required that the representation on the display should allow the user to recognize that the generator 19 is not in normal condition. The user can recognize that the generator 19 is not in normal condition by seeing the representation on the display. Thus, the user can understand that the generator 19 needs inspection.

When it is determined in the processing at step S104 that the vehicle is not in normal condition, the information representing that the vehicle is not in normal condition can be shown on the display as the reason for the prohibition of the feeding. It is only required that the representation on the display should allow the user to recognize that the vehicle is not in normal condition. The user can recognize that the vehicle is not in normal condition by seeing the representation on the display. Thus, the user can understand that the vehicle needs inspection.

When it is determined in the processing at step S105 that the remaining amount of the fuel is less than the threshold value, the information representing that the fuel stored in the fuel tank 17 is insufficient can be shown on the display as the reason for the prohibition of the feeding. It is only required that the representation on the display should allow the user to recognize that the fuel is insufficient. The user can recognize that the fuel is insufficient by seeing the representation on the display. Thus, the user can understand that the fuel needs replenishing.

The information about the reason for the prohibition of the feeding can be output as the sound from the speaker. When the power management ECU 20 proceeds from the processing at steps S101 to S105 to the processing at step S107, the contents determined in the processing at steps S101 to S105 can be regarded as the reason for the prohibition of the feeding.

Specifically, the information shown on the display described above can be output as the sound from the speaker. It is only required that the sound output from the speaker should allow the user to know the contents determined in the processing at steps S101 to S105. For example, when the remaining amount of the fuel is less than the threshold value in the processing at step S105, the information representing that the fuel stored in the fuel tank 17 is insufficient can be output as the sound to provide the reason for the prohibition of the feeding.

According to the present embodiment, when the feeding to the external device is prohibited, the user can recognize not only the prohibition of the feeding but also the reason for the prohibition of the feeding. The user can decide on action to be taken after the prohibition of the feeding based on the reason for the prohibition of the feeding.

Although the processing from step S105 to step S107 is performed in the present embodiment, the present invention is not limited thereto. It is only required that at least one of the processing from step S105 to step S107 should be performed.

Although the feeding from the feeding apparatus 15 to the external device is prohibited in the present embodiment, the present invention is not limited thereto. For example, the operation of the system shown in FIG. 1 may be prohibited in the processing at step S107. The prohibition of the operation of the system switches the system main relay 13 from ON to OFF.

Although the vehicle (so-called hybrid vehicle) including the assembled battery 14 and the engine 16 as the motive power sources for running the vehicle is described in the present embodiment, the present invention is not limited thereto.

For example, the present invention is applicable to a vehicle (so-called electric vehicle) including only the assembled battery 14 as the motive power source for the vehicle. In the electric vehicle, the engine 16 and the generator 19 shown in FIG. 1 are omitted, and the electric power of the assembled battery 14 is supplied to the external device through the feeding apparatus 15. Alternatively, the present invention is applicable to a vehicle including only the engine 16 as the motive power source for the vehicle. In this case, the assembled battery 14 shown in FIG. 1 is omitted, and the electric power of the generator 19 is supplied to the external device through the feeding apparatus 15.

A charge system for supplying the electric power of an external power source to the assembled battery 14 can be mounted on the vehicle. The external power source is a power source provided outside the vehicle and independently of the vehicle, and an example of the external power source is a commercial power source. When the external power source supplies an AC power, a charger mounted on the vehicle can convert the AC power into a DC power. Then, the charger can supply the DC power to the assembled battery 14. When the external power source supplies a DC power, the DC power can be supplied to the assembled battery 14.

Embodiment 2

A vehicle which is Embodiment 2 of the present invention will hereinafter be described. Components identical to those described in Embodiment 1 are designated with the same reference numerals, and detailed description thereof is omitted. The present embodiment differs from Embodiment 1 in the processing of supplying an electric power to an external device. The following description is mainly focused on differences from Embodiment 1.

Figure 3:
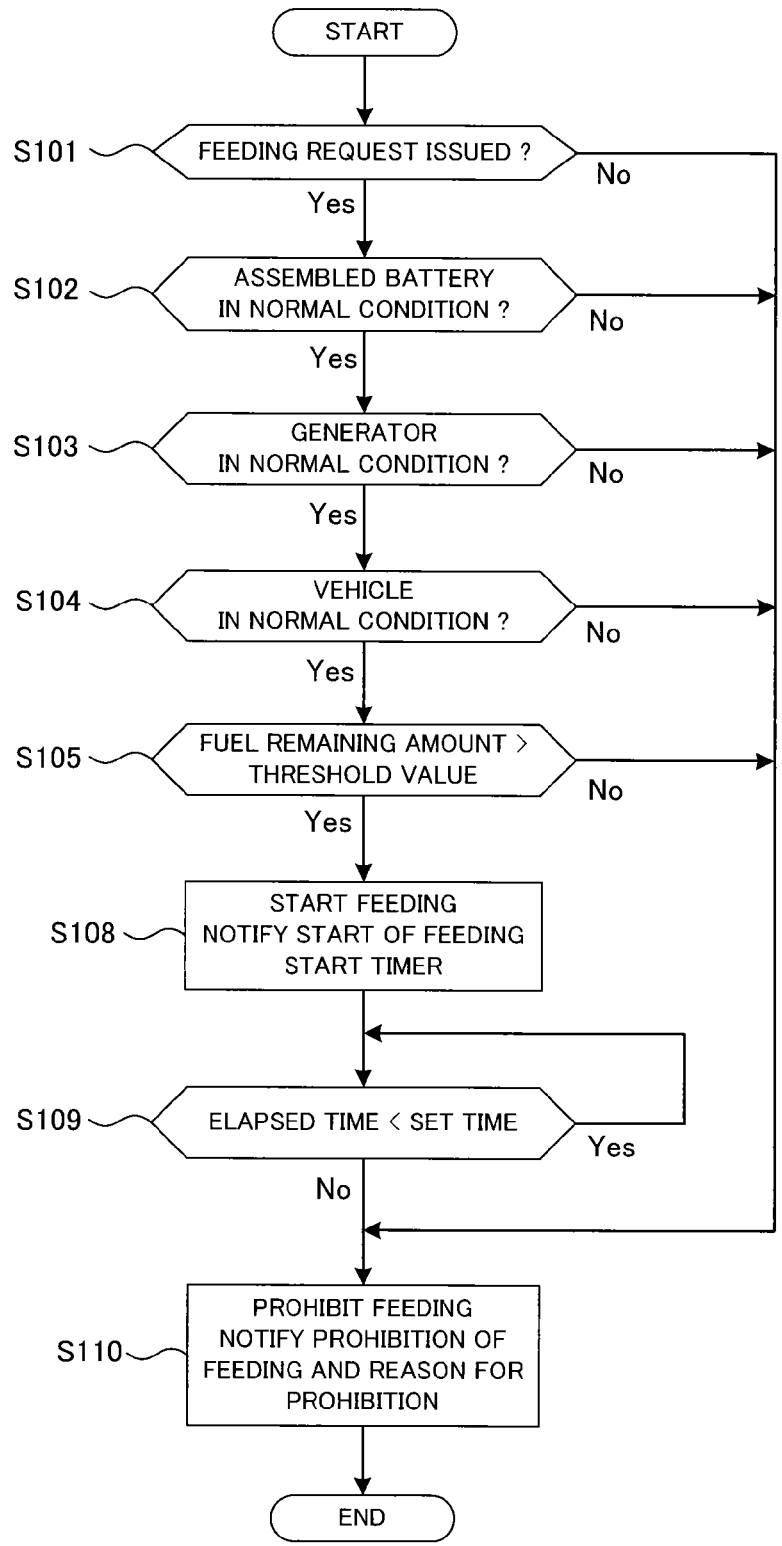
FIG. 3 is a flow chart showing the processing of supplying an electric power to an external device in Embodiment 2.

FIG. 3 is a flowchart for explaining the processing of supplying the electric power to the external device in the present embodiment. In FIG. 3, processing operations identical to those described in Embodiment 1 (FIG. 2) are designated with the same reference numerals, and detailed description thereof is omitted.

When it is determined in processing at step S105 that the remaining amount of the fuel is more than a threshold value, a power management ECU 20 proceeds to processing at S108. When the remaining amount of the fuel is less than the threshold value, the power management ECU 20 proceeds to processing at step S110.

At step S108, the power management ECU 20 notifies a user of the start of feeding through the use of a sound or display. Specifically, the power management ECU 20 transmits information representing the start of feeding to a meter ECU 22 or a matching ECU 23. The operations of the meter ECU 22 and the matching ECU 23 are identical to those described in Embodiment 1 (step S106 in FIG. 2). At step S108, the power management ECU 20 starts measuring time with a timer.

At step S109, the power management ECU 20 determines whether or not the elapsed time measured by the timer is shorter than a set time. The set time can be a predetermined time or a time which can be arbitrarily set by the user. The user can set the time by operating a switch mounted on the vehicle or operating a remote key 24. When the elapsed time is shorter than the set time, the power management ECU 20 continues the feeding to the external device. When the elapsed time is longer than the set time, the power management ECU 20 proceeds to the processing at step S110.

At step S110, the power management ECU 20 prohibits the operation of a feeding apparatus 15. When the supply of the electric power is in progress from the feeding apparatus 15 to the external device, the supply of the electric power to the external device is stopped.

At step S110, the power management ECU 20 notifies the user of a failure to perform the feeding with the display or sound. Specifically, the power management ECU 20 transmits information representing the failure to perform the feeding to the meter ECU 22 or the matching ECU 23. The operations of the meter ECU 22 and the matching ECU 23 are identical to those described in Embodiment 1 (step S106 in FIG. 2).

The power management ECU 20 notifies the user of the reason for the prohibition of the feeding with the display or sound. Specifically, the power management ECU 20 transmits information representing the reason for the prohibition of the feeding to the meter ECU 22 or the matching ECU 23.

When the power management ECU 20 proceeds from the processing at steps S101 to S105 to the processing at step S110, the contents determined in the processing at steps S101 to S105 can be regarded as the reason for the prohibition of the feeding. When the power management ECU 20 proceeds from the processing at step S109 to the processing at step S110, the fact that the elapsed time exceeds the set time can be regarded as the reason for the prohibition of the feeding.

The information about the reason for the prohibition of the feeding can be shown to the user using a display or a speaker as described in Embodiment 1. Examples of the display include a display mounted on the vehicle and a display provided for the remote key 24. Examples of the speaker include a speaker mounted on the vehicle or a speaker provided for the remote key 24.

For example, when the elapsed time exceeds the set time in the processing at step S109, the information representing that the elapsed time (time of feeding to the external device) exceeds the set time can be shown on the display as the reason for the prohibition of the feeding. It is only required that the representation on the display should allow the user to recognize that the feeding time exceeds the set time. The user can recognize that the feeding time exceeds the set time by seeing the representation on the display. As required, the user can resume the feeding.

The invention claimed is:
1. A vehicle comprising:
a feeding system configured to supply an electric power to an external device disposed outside the vehicle and including an engine that produces a motive power through combustion of a fuel and a generator that receives the motive power from the engine to generate an electric power;

a controller configured to control operation of the feeding system; and an information output unit configured to output predetermined information, wherein the controller is configured to determine whether or not a power feeding can be performed from the feeding system to the external device, when a time period of power generation by the generator is longer than a set time, the controller is configured to determine that the power feeding to the external device cannot be performed, and when the power feeding from the feeding system to the external device is stopped, the controller is configured to cause the information output unit to output stop information about the stop of the power feeding, the stop information including information about the time period of power generation.

2. The vehicle according to claim 1, wherein the feeding system includes a sensor configured to detect a remaining amount of the fuel, the controller is configured to determine that the power feeding to the external device cannot be performed when the remaining amount detected by the sensor is less than a threshold value, and the controller is configured to cause the information output unit to output the stop information including information about the insufficient remaining amount of the fuel.

3. The vehicle according to claim 1, wherein the controller is configured to determine whether or not the power feeding to the external device can be performed based on a state of the engine or the generator, and the controller is configured to cause the information output unit to output the stop information including information about the state of the engine or the generator when the power feeding to the external device is stopped.

4. The vehicle according to claim 1, wherein the feeding system includes an electric storage apparatus outputting an electric power used in running of the vehicle and an electric power to be supplied to the external device, the controller is configured to determine whether or not the power feeding to the external device can be performed based on a state of the electric storage apparatus, and the controller is configured to cause the information output unit to output the stop information including information about the state of the electric storage apparatus when the power feeding to the external device is stopped.

5. The vehicle according to claim 1, wherein the information output unit is a display or a speaker.

6. The vehicle according to claim 1, wherein the information output unit is configured to transmit the stop information to a portable device.

7. The vehicle according to claim 6, wherein the portable device has a display, and the information output unit is configured to transmit information to be shown on the display as the stop information.

8. The vehicle according to claim 6, wherein the portable device has a speaker, and the information output unit is configured to transmit sound information to be output from the speaker as the stop information.

9. A control method of controlling a feeding system mounted on a vehicle and supplying an electric power to an external device disposed outside the vehicle, the feeding system including an engine that produces a motive power through combustion of a fuel and a generator that receives the motive power from the engine to generate an electric power, comprising:

determining whether or not a power feeding can be performed from the feeding system to the external device;

determining that the power feeding to the external device cannot be performed when a time period of power generation by the generator is longer than a set time; and when the power feeding from the feeding system to the external device is stopped, outputting stop information about the stop of the feeding to the external device from an information output unit, the stop information including information about the time period of power generation.

10. The control method according to claim 9, wherein the feeding system includes a sensor detecting a remaining amount of the fuel, the method further comprising:

determining that the power feeding to the external device cannot be performed when the remaining amount detected by the sensor is less than a threshold value, and causing the information output unit to output the stop information including information about the insufficient remaining amount of the fuel when the power feeding to the external device is stopped.

11. The control method according to claim 9, further comprising:

determining whether or not the power feeding can be performed on the basis of a state of the engine or the generator, and causing the information output unit to output the stop information including information about the state of the engine or the generator when the power feeding to the external device is stopped.

12. The control method according to claim 9, wherein the feeding system includes an electric storage apparatus outputting an electric power used in running of the vehicle and an electric power to be supplied to the external device, the method further comprising:

determining whether or not the power feeding can be performed on the basis of on a state of the electric storage apparatus, and causing the information output unit to output the stop information including information about the state of the electric storage apparatus when the power feeding to the external device is stopped.

13. The control method according to claim 9, further comprising causing the information output unit to transmit the stop information to a portable device.

14. The vehicle according to claim 6, wherein the portable device is a remote key of the vehicle.

15. The control method according to claim 13, wherein the portable device is a remote key of the vehicle.

* * * * *